(12) United States Patent
Chen et al.

(10) Patent No.: US 11,425,181 B1
(45) Date of Patent: Aug. 23, 2022

(54) SYSTEM AND METHOD TO INGEST ONE OR MORE VIDEO STREAMS ACROSS A WEB PLATFORM

(71) Applicant: CLIPr Co., Kirkland, WA (US)

(72) Inventors: Humphrey Chen, Norwood, NJ (US); Cindy Chin, New York, NY (US); Aaron Sloman, Costa Mesa, CA (US)

(73) Assignee: CLIPr Co., Kirkland, WA (US)

( * ) Notice: Subject to any disclaimer, the term of this patent is extended or adjusted under 35 U.S.C. 154(b) by 2 days.

(21) Appl. No.: 17/317,638

(22) Filed: May 11, 2021

(51) Int. Cl.
| | |
|---|---|
| *H04N 21/40* | (2011.01) |
| *H04L 65/60* | (2022.01) |
| *H04N 21/44* | (2011.01) |
| *H04N 21/433* | (2011.01) |
| *H04L 9/40* | (2022.01) |
| *G06F 16/78* | (2019.01) |
| *G06F 16/71* | (2019.01) |
| *H04N 21/432* | (2011.01) |
| *G06V 20/40* | (2022.01) |

(52) U.S. Cl.
CPC .............. *H04L 65/60* (2013.01); *G06F 16/71* (2019.01); *G06F 16/7867* (2019.01); *G06V 20/40* (2022.01); *H04L 63/083* (2013.01); *H04L 63/0853* (2013.01); *H04N 21/432* (2013.01); *H04N 21/4334* (2013.01); *H04N 21/44008* (2013.01)

(58) Field of Classification Search
None
See application file for complete search history.

(56) References Cited

U.S. PATENT DOCUMENTS

| | | | |
|---|---|---|---|
| 5,835,667 A | 11/1998 | Wactlar et al. | |
| 10,148,647 B1 | 12/2018 | Vongsouvanh et al. | |
| 2002/0093591 A1 | 7/2002 | Yihong et al. | |
| 2010/0191689 A1* | 7/2010 | Cortes | G06V 20/40 725/35 |
| 2013/0254314 A1* | 9/2013 | Chow | H04L 67/06 709/206 |

(Continued)

FOREIGN PATENT DOCUMENTS

DE 102006027720 12/2007

OTHER PUBLICATIONS

International Search Report and Written Opinion of the International Searching Authority for PCT/US2021/032170 dated Feb. 24, 2022, 13 pages.

*Primary Examiner* — Cai Y Chen
(74) *Attorney, Agent, or Firm* — Lowenstein Sandler LLP

(57) ABSTRACT

System and method to ingest one or more video streams across a web platform are disclosed. The system an input module configured to receive at least one web address associated of the corresponding video streams across the web platform, a video analysis module configured to analyse content of the video streams, a token receiving module configured to identify contact detail associated to the user on receiving a prompt from the contact detail; to generate an automated message to transfer contact detail of the user and to receive an access token from the user, a video exception module configured to enable the user to debug a video retrieving process if a prompt is not generated from the contact detail and to create at least one of a set of rules, a set of logic or a combination thereof, to analyse the content of the video streams.

12 Claims, 4 Drawing Sheets

(56) References Cited

U.S. PATENT DOCUMENTS

2014/0282673 A1* 9/2014 Neumeier .......... H04N 21/8126
                                                725/19
2018/0176661 A1   6/2018 Varndell et al.
2019/0238952 A1* 8/2019 Boskovich ....... H04N 21/23418

* cited by examiner

SYSTEM AND METHOD TO INGEST ONE OR MORE VIDEO STREAMS ACROSS A WEB PLATFORM

FIELD OF INVENTION

Embodiments of a present disclosure relate to accessing the video stream, and more particularly, to a system and method to ingest one or more video streams across a web platform.

BACKGROUND

Video Streaming or streaming media is a process where multimedia is constantly received by and presented to an end-user while being delivered by a provider. With a linear growth in technology, users often watch various multimedia streaming at a day-to-day activity level, which is increasing a demand for content providers and streaming methods. One such streaming method includes video streaming across a web platform. The most commonly used streaming method is sharing a web address to an end user to view the content associated with the videos of the web address. One such method for automating the ingestion of video streams across the web platform is being disclosed.

BRIEF DESCRIPTION

In accordance with one embodiment of the disclosure, a system to ingest one or more video streams across a web platform is disclosed. The system includes one or more processors. The system also includes an input module configured to receive at least one web address associated with the corresponding one or more video streams across the web platform, from a user. The system also includes a video analysis module configured to analyse content of the corresponding one or more video streams using one of a machine learning technique, a computer vision technique, a natural language processing, or a combination thereof. The system also includes a token receiving module configured to identify at least one contact detail associated with the user on receiving a prompt from the corresponding at least one contact detail. The token receiving module is also configured to generate an automated message to transfer to the at least one contact detail of the user. The token receiving module is also configured to receive an access token from the user via at least one contact detail to analyse the one or more video streams further. The system also includes a video exception module configured to enable the user to debug a video retrieving process if a prompt is not generated from the corresponding at least one contact detail. The video exception module is also configured to create at least one of a set of rules, a set of logic or a combination thereof, to analyse the content of the corresponding one or more video streams. The system also includes a video storage module configured to store the one or more video streams with the content, the set of rules, the set of logic, in a video library database.

In accordance with another embodiment of the disclosure, a method for ingesting one or more video streams across a web platform is disclosed. The method includes receiving at least one web address associated with the corresponding one or more video streams across the web platform, from a user. The method also includes analysing content of the corresponding one or more video streams using one of a machine learning technique, a computer vision technique, a natural language processing, or a combination thereof. The method also includes identifying at least one contact detail associated with the user on receiving a prompt from the corresponding at least one contact detail. The method also includes generating an automated message to transfer to the at least one contact detail of the user. The method also includes receiving an access token from the user via at least one contact detail for analysing the one or more video streams further. The method also includes enabling the user for debugging a video retrieving process if a prompt is not generated from the corresponding at least one contact detail. The method also includes creating at least one of a set of rules, a set of logic or a combination thereof, for analysing the content of the corresponding one or more video streams. The method also includes storing the one or more video streams with the content in a video library database.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
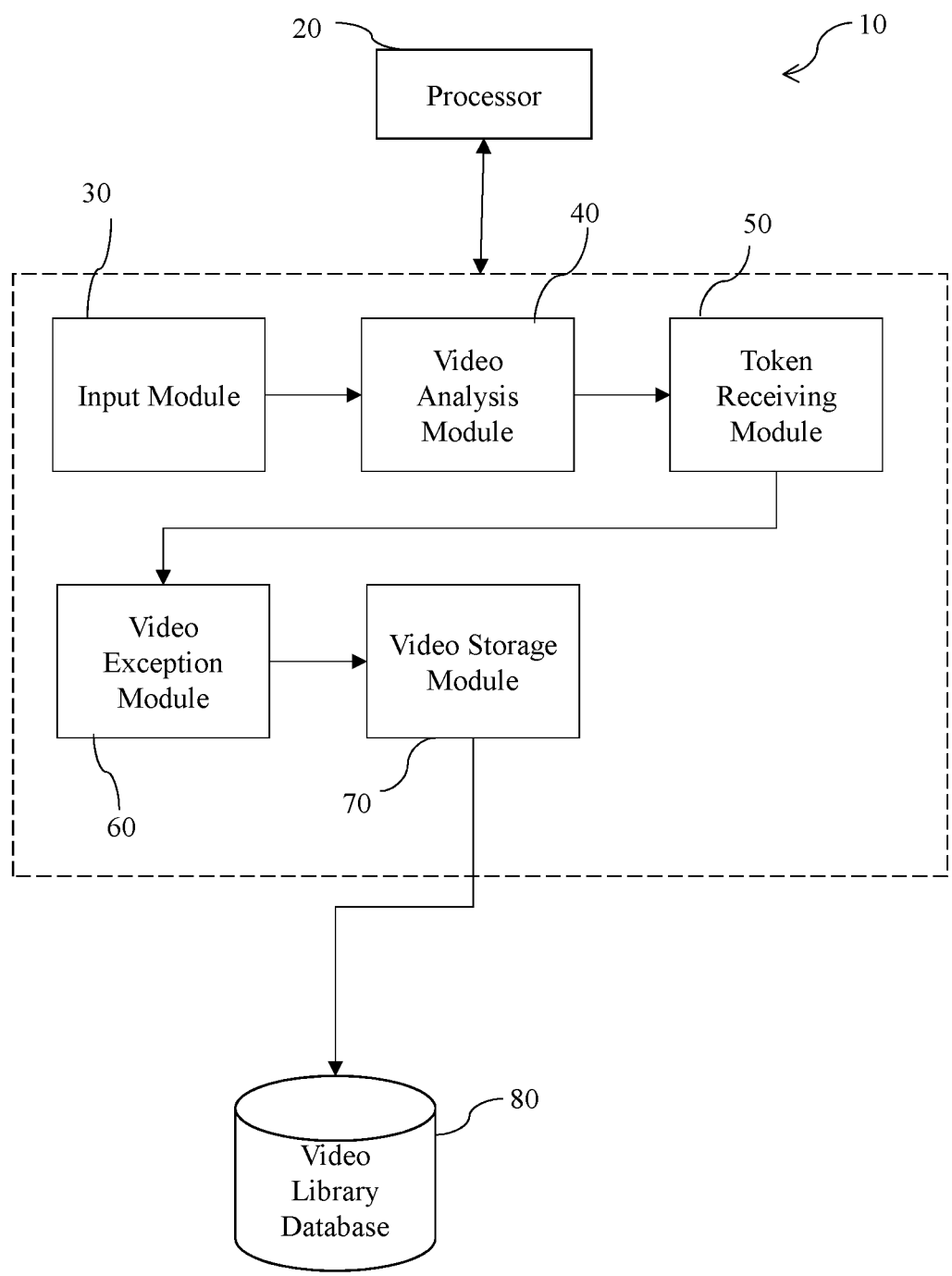
FIG. 1 is a block diagram representation of a system to ingest one or more video streams across a web platform in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to ingest one or more video streams across a web platform. As used herein, the term 'ingest or ingestion' which is often referred to as data ingestion is defined as transportation of data from assorted sources to a storage medium where it can be accessed, used, and analyzed by an entity. In one embodiment, the web platform may include one of an online meeting platform, an e-commerce platform, social networking platforms, forums, content websites, or the like.

FIG. 1 is a block diagram representation of a system 10 to ingest one or more video streams across a web platform in accordance with an embodiment of the present disclosure. The system 10 includes one or more processors 20. The system 10 also includes multiple modules which are operable by the one or more processors 20. The system 10 also includes an input module 30 configured to receive at least one web address associated to the corresponding one or more video streams across the web platform, from a user. In one embodiment, the at least one web address may include one of a uniform resource locator, an email, or location of a file on a local machine to be processed or a combination thereof, wherein the at least one web address comprises the corresponding one or more video streams. In one exemplary embodiment, at least one web address may be one of a centralized platform or a decentralized platform. In such embodiment, the decentralized platform may be one of an umbrella platform, a private platform or a public platform. Further, based on the type of platform, the corresponding plurality of users may have access for the same. Further, in one specific embodiment, the user may transmit at least one web address via a user device. More specifically, the one or more video streams may include one or more videos which may be shared via the web address. The one or more videos may be associated with a specific event which may have happened or may be happening in real time.

The system 10 also includes a video analysis module 40 configured to analyse content of the corresponding one or more video streams using one of a machine learning technique, an artificial intelligence technique, a computer vision technique, a natural language processing, or a combination thereof. Upon receiving at least one web address, the video analysis module 40 tries to retrieve the content associated to the corresponding at least one web address, further to which the video analysis module 40 tries to analyse the content of the one or more video streams associated to the at least one web address. As used herein, the term 'machine learning (ML) technique' is defined as a study of computer algorithms that improve automatically through experience upon learning using a built model which is based on a sample set of data. In one embodiment, the ML technique may include one of a supervised technique. Also, the term 'artificial intelligence (AI) technique' is defined as an intelligence demonstrated by machines to perform or mimic human intelligence and human behavior. In one exemplary embodiment, the AI technique may include the natural language processing technique, the computer vision technique, or the like.

The system 10 also includes a token receiving module 50 configured to identify at least one contact detail associated with the user on receiving a prompt from the corresponding at least one contact detail. In one embodiment, at least one contact detail may include one of an electronic mail (e-mail), a username, or a combination thereof. More specifically, when a user tries to retrieve one or more videos from the corresponding at least one web address, the prompt may be generated. On receiving the prompt, the token receiving module 50 will locate the corresponding at least one contact detail through which the prompt was generated. In one embodiment, the prompt may include one of an email prompt, a username prompt, or a combination thereof corresponding to at least one contact detail.

If the one or more video streams are accessible, then the user can view the same upon converting the one or more videos to a required file or format. If the one or more are not accessible or if the user is unable to retrieve the same, the token receiving module 50 will generate an automated message to transfer to at least one contact detail of the user. In one embodiment, the automated message may be pre-fed to the token receiving module 50 by an authorized user, wherein the message may be associated with a set of rules. In one embodiment, the set of rules may include a subject for the message, content of the message, body of the message, or the like. In another embodiment, the set of rules may include a list of instructions representative of a situation or a circumstance at which the message needs to be sent automatically. In one exemplary embodiment, the token receiving module 50 may be configured to generate the message automatically based on the set of rules which may be pre-defined. Here the message may not be pre-written and stored. In one specific embodiment, the message may include one of an e-mail, a voice message, a text message, a multimedia message, or the like.

The token receiving module 50 is further configured to receive an access token from the user via at least one contact detail to analyse the one or more video streams further. More specifically, when the automated message is sent to the user, the user may in turn send the access token upon reviewing the message, in order to enable one or more other users to view the corresponding one or more video streams associated with the at least one web address. In one embodiment, the access token may be a OAuth token, wherein the user inputs a password to cache the corresponding OAuth token. As used herein, the term 'OAuth' is defined as an open standard authorization framework for token-based authorization on the web platform. How OAuth works is, it enables an end user's account information to be used by third-party services without exposing the user's account credentials to the third party OAuth acts as an intermediary on behalf of the end user, providing the third-party service with an access token that authorizes specific account information to be shared. The process for obtaining the token is known as an authorization flow. Here, the end user may be similar to the one or more users.

In one specific embodiment, the user may also provide access to the one or more users to view the one or more videos by modifying certain privacy settings on the web platform and authorizing only the one or more users to view the same, upon receiving and reviewing the automated message by the user.

Furthermore, the system 10 includes a video exception module 60 configured to enable the user to debug the video retrieving process if a prompt is not generated from the corresponding at least one contact detail. More specifically, if the generation of the prompt by the at least one contact detail is not generated, or in a situation where the one or more users are still unable to view the one or more videos after receiving the access token from the user, video exception module 60 bounces to an exception handling queue to enable the user to debug the video retrieving process.

Further, the video exception module 60 is configured to create at least one of a set of rules, a set of logic or a combination thereof, to analyse the content of the corresponding one or more video streams. More specifically, based on the errors, bugs or the problems which was generated during the retrieval of the one or more videos, video exception module 60 learns and creates at least one of the set of rules, the set of logic or a combination thereof to make the debugging automated when such a similar situation occurs for a second time; upon enabling a building block model to learn from the debugged situation, and enhance the learning. In one exemplary embodiment, analysing the content of the corresponding one or more video streams may include scanning the one or more video streams to identify the content for further analysis.

The system 10 also includes a video storage module 70 configured to store the one or more video streams with the content, the set of rules, the set of logic, in a video library database 80. In operation, the content, the set of rules, the set of logic may be stored in the video library database 80 upon receiving an instruction from the one or more processors 20. In one embodiment, the content, the set of rules, the set of logic may be stored or added to a platform roadmap to enable the ingestion of the one or more video streams.

Figure 2:
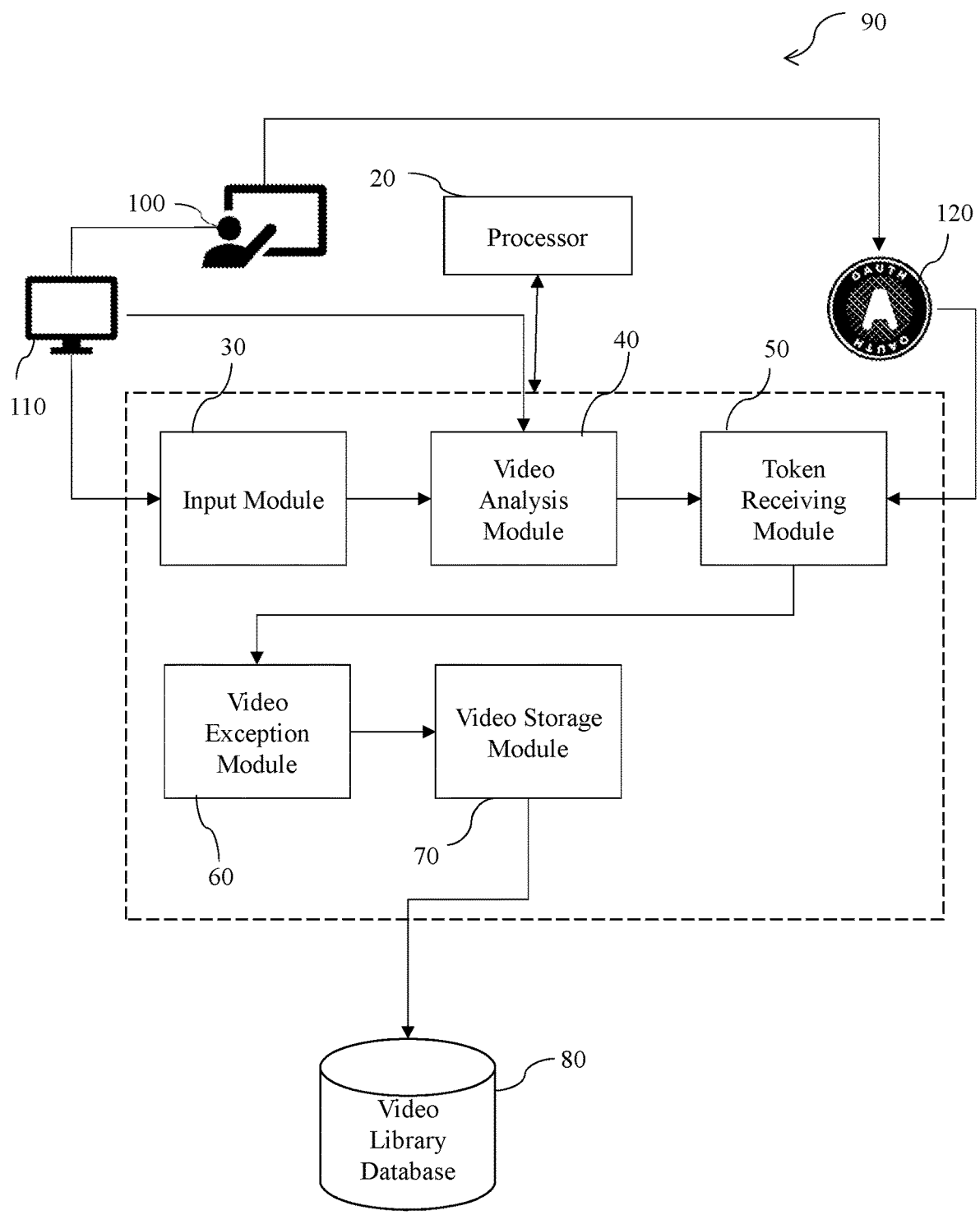
FIG. 2 is a block diagram representation of an exemplary embodiment of the system to ingest a video stream associated to a classroom learning across a web platform of FIG. 1 in accordance with an embodiment of the present disclosure.

FIG. 2 is a block diagram representation of an exemplary embodiment of the system 90 to ingest a video stream associated to a classroom learning across a web platform of FIG. 1 in accordance with an embodiment of the present disclosure. A professor 100 teaches a subject 'A', records the video of the teaching, and shares a recorded video in a form of a URL with multiple students on a platform via an input module 30 through a computing device 110. The video analysis module 40 will analyse content of the recorded video using an ML technique, upon saving the file received from input module 30 a file. Further, a username of the professor gets prompted on the platform, consequently the e-mail address of the professor 100 is identified by a token receiving module 50. Then in a situation, where the recorded video is being unable to view by the multiple students, the token receiving module 50 generated an automated email to the e-mail address of the professor 100. Further, the professor 100 receives the e-mail and as a response, the professor 100 sends an OAuTH token 120 to the token receiving module 50. However, the access and the retrieval of the recorded video from the URL is still denied.

Subsequently, a video exception module 60 enables an authorized user to manually debug the issue, when even prompt is not getting generated. Once the authorized user debugs the issue, a set of rules and a set of logic is created and transmitted to the system 90. Based on the set of rules and the set of logic, a building block model which is responsible to debug the issue will now learn and utilize the same for a similar situation. The set of rules and the set of logic is now added to the platform roadmap. Also, the same is stored in a video library database 80 by a video storage module 70.

It should be noted that all the above-described modules of FIG. 2 are operable by one or more processors 20. Furthermore, the system 90, input module 30, the video analysis module 40, the token receiving module 50, the video exception module 60, the video storage module 70 and the video library database 80 of FIG. 2 are substantially similar to a system 10, an input module 30, a video analysis module 40, a token receiving module 50, a video exception module 60, a video storage module 70 and a video library database 80 of FIG. 1, and all the embodiments described in FIG. 1 applies to corresponding modules of FIG. 2.

Figure 3:
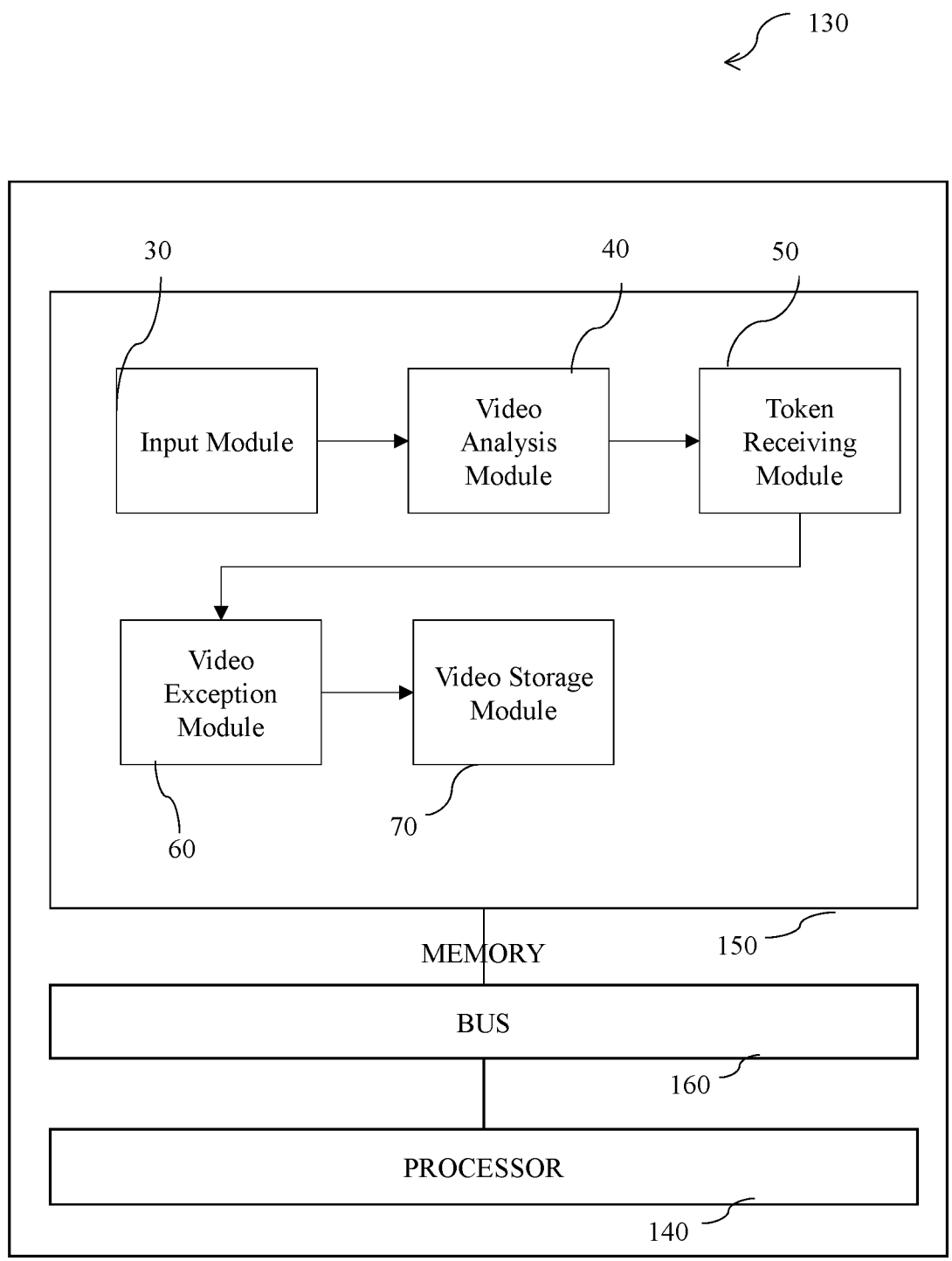
FIG. 3 is a block diagram representation of a processing subsystem located on a local server or on a remote server in accordance with an embodiment of the present disclosure.

FIG. 3 is a block diagram representation of a processing subsystem located on a local server or on a remote server in accordance with an embodiment of the present disclosure. The server 130 includes processor(s) 140, and memory 150 operatively coupled to the bus 160.

The processor(s) 140, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 4:
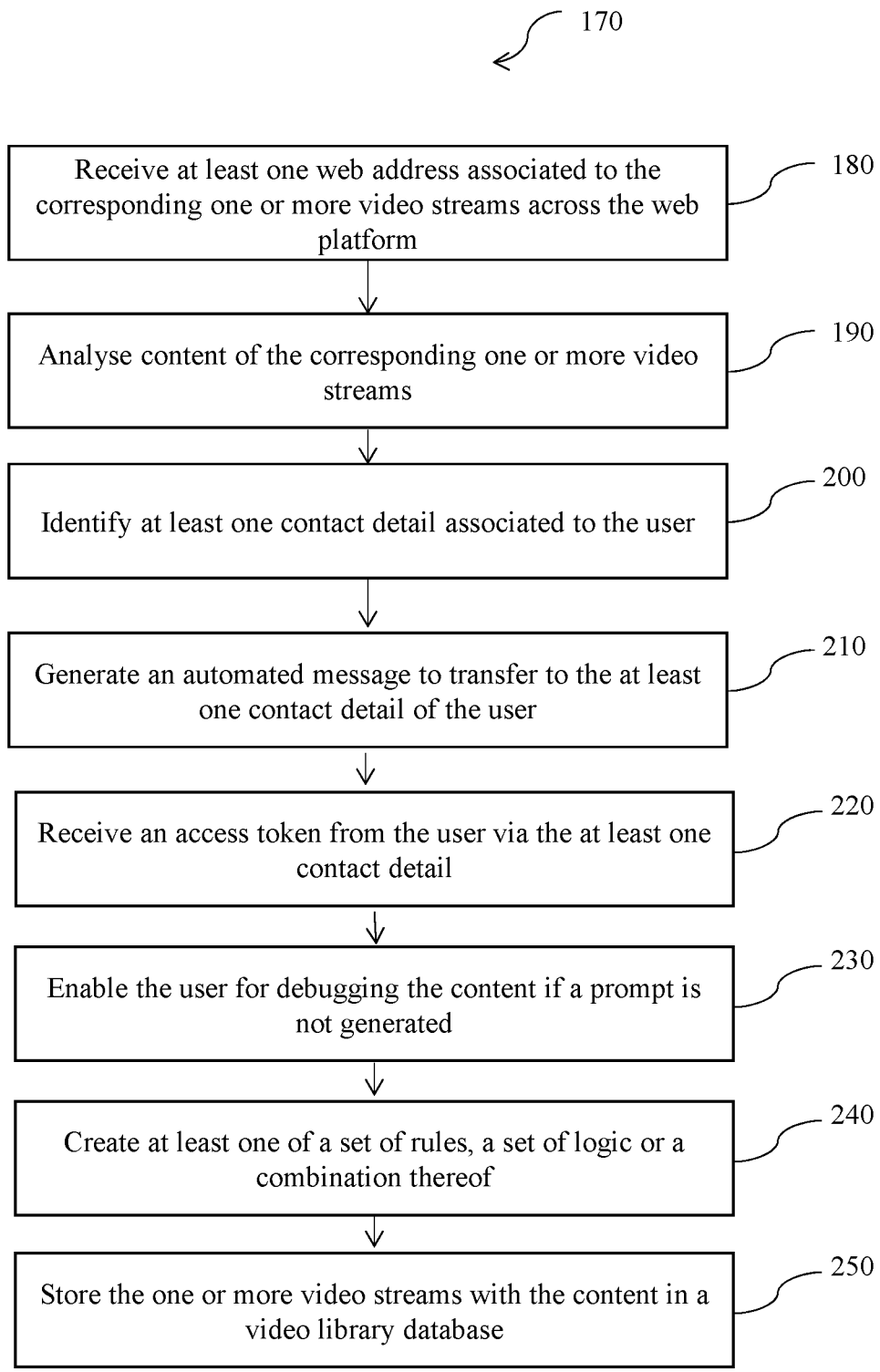
FIG. 4 is a flow chart representing steps involved in a method for ingesting one or more video streams across a web platform in accordance with an embodiment of the present disclosure.

The memory 150 includes a plurality of modules stored in the form of an executable program which instructs the processor 140 to perform the method steps illustrated in FIG. 4. The memory 150 is substantially similar to the system 10 of FIG. 1. The memory 150 has the following modules: an input module 30, a video analysis module 40, a token receiving module 50, a video exception module 60 and a video storage module 70.

The input module 30 is configured to receive at least one web address associated with the corresponding one or more video streams across the web platform. The video analysis module 40 is configured to analyse content of the corresponding one or more video streams. The token receiving module 50 is configured to identify at least one contact detail associated to the user on receiving a prompt from the corresponding at least one contact detail, to generate an automated message to transfer to the at least one contact detail of the user and to receive an access token from the user via the at least one contact detail to analyse the one or more video streams further. The video exception module 60 is configured to enable the user to debug a video retrieving process if a prompt is not generated from the corresponding at least one contact detail and to create at least one of a set of rules, a set of logic or a combination thereof, to analyse the content of the corresponding one or more video streams. The video storage module 70 is configured to store the one or more video streams with the content, the set of rules, the set of logic, in a video library database.

FIG. 4 is a flow chart representing steps involved in a method 170 for ingesting one or more video streams across a web platform in accordance with an embodiment of the present disclosure. The method 170 includes receiving at least one web address associated with the corresponding one or more video streams across the web platform, from a user. In one embodiment, receiving at least one web address may include receiving the at least one web address by an input module. In one exemplary embodiment, receiving at least one web address may include receiving one of a uniform resource locator, an email, or a combination thereof, wherein the at least one web address comprises the corresponding one or more video streams.

The method 170 also includes analysing content of the corresponding one or more video streams using one of an artificial intelligence technique, a machine learning technique, a computer vision technique, a natural language processing, or a combination thereof. In one embodiment, analysing the content may include analysing the content by a video analysis module.

The method 170 also includes identifying at least one contact detail associated with the user on receiving a prompt from the corresponding at least one contact detail. In one embodiment, identifying at least one contact detail may include identifying at least one contact detail by a token receiving module. In one exemplary embodiment, identifying at least one contact detail may include identifying one of an electronic mail (e-mail), a username, or a combination thereof. In one embodiment, receiving the prompt may include receiving one of an email prompt, a username prompt, or a combination thereof corresponding to at least one contact detail.

Furthermore, the method 170 includes generating an automated message to transfer to the at least one contact detail of the user. In one embodiment, generating the automated message may include generating the automated message by the token receiving module. In one exemplary embodiment, generating the automated message may include generating the automated message using one of the AI technique, the ML technique, or the combination thereof.

The method 170 also includes receiving an access token from the user via at least one contact detail for analysing the one or more video streams further. In one embodiment, receiving the access token may include receiving the access token by the token receiving module. In one exemplary embodiment, receiving the access token may include receiving a OAuth token.

In one specific embodiment, the method 170 may further include providing access to the one or more users to view the one or more videos by modifying certain privacy settings on the web platform and authorizing only the one or more users to view the same, upon receiving and reviewing the automated message by the user.

The method 170 also includes enabling the user for debugging a video retrieving process if a prompt is not generated from the corresponding at least one contact detail. In one embodiment, enabling the user for debugging the video retrieving process may include enabling the user for debugging the video retrieving process by a video exception module.

The method 170 also includes creating at least one of a set of rules, a set of logic or a combination thereof, for analysing the content of the corresponding one or more video streams. In one embodiment, creating at least one of the set of rules, the set of logic may include creating at least one of the set of rules, the set of logic by the video exception module. In one exemplary embodiment, analysing the content of the corresponding one or more video streams may include scanning the one or more video streams to identify the content for further analysis.

Furthermore, the method 170 includes storing the one or more video streams with the content in a video library database. In one embodiment, storing the one or more video streams may include storing the one or more video streams by a video storage module.

Various embodiments of the present disclosure enable the system to provide a platform to automate ingestion of video streams across the web platform, which makes the system more reliable and efficient since the system automatically learns from its past and enables the same in the future due to the use of ML and AI techniques.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system to ingest one or more video streams across a web platform, the system comprising:
   one or more processors;
   an input module, operable by the one or more processors, configured to receive a web address associated with the one or more video streams;
   a video analysis module, operable by the one or more processors, configured to analyze content of the one or more video streams;
   a token receiving module, operable by the one or more processors, configured to:
      identify at least one contact detail associated with a user upon prompting the user for contact details;
      generate an automated message to transfer to the at least one contact detail of the user; and
      receive an access token from the user via the at least one contact detail to further analyze the one or more video streams;
   a video exception module, operable by the one or more processors, configured to:
      enable the user to debug a video retrieving process if a prompt is not generated from the at least one contact detail; and
      create a set of rules, a set of logic or a combination thereof, to analyze the content of the one or more video streams; and
   a video storage module, operable by the one or more processors, configured to store the one or more video streams with the analyzed content in a video library database.

2. The system of claim 1, wherein the web address associated with the one or more video streams comprises a uniform resource locator, an email, or a combination thereof.

3. The system of claim 1, wherein at least one contact detail comprises an email address, a username, or a combination thereof.

4. The system of claim 3, wherein the prompt comprises one of an email prompt, a username prompt, or a combination thereof.

5. The system of claim 1, wherein analyzing the content of the one or more video streams comprises scanning the one or more video streams to identify the content for further analysis.

6. The system of claim 1, wherein the access token comprises an OAuth token, and wherein the user inputs a password to cache the corresponding OAuth token.

7. A method of ingesting one or more video streams across a web platform, the method comprising:
- receiving, by an input module, a web address associated with one or more video streams;
- analyzing, by a video analysis module, content of the one or more video streams;
- identifying, by a token receiving module, at least one contact detail associated with a user upon prompting the user for contact detail;
- generating, by the token receiving module, an automated message to transfer to the at least one contact detail of the user;
- receiving, by the token receiving module, an access token from the user via the at least one contact detail to further analyze the one or more video streams;
- enabling, by a video exception module, the user to debug a video retrieving process if a prompt is not generated for at least one contact detail;
- creating, by the video exception module, a set of rules, a set of logic or a combination thereof, for analyzing the content of the one or more video streams; and
- storing, by a video storage module, the one or more video streams with the analyzed content in a video library database.

8. The method of claim 7, wherein the web address associated with the one or more video streams comprises a uniform resource locator, an email, or a combination thereof.

9. The method of claim 7, wherein at least one contact detail comprises an email address, a username, or a combination thereof.

10. The system of claim 9, wherein the prompt comprises one of an email prompt, a username prompt, or a combination thereof.

11. The system of claim 7, wherein analyzing the content of the one or more video streams comprises scanning the one or more video streams to identify the content for further analysis.

12. The system of claim 7, wherein the access token comprises an OAuth token, and wherein the user inputs a password to cache the corresponding OAuth token.

\* \* \* \* \*